US012808342B2

(12) United States Patent
Kodavasal et al.

(10) Patent No.: US 12,808,342 B2
(45) Date of Patent: Nov. 24, 2026

(54) SYSTEMS AND METHODS FOR ZERO NOx EMISSIONS DURING AN OPERATING PERIOD

(71) Applicant: Cummins Inc., Columbus, IN (US)

(72) Inventors: Janardhan Kodavasal, Indianapolis, IN (US); Andrew W. Osburn, Nashville, IN (US); Adam C. Cecil, Columbus, IN (US); Anant Puri, Greenwood, IN (US); Ming-Feng Hsieh, Nashville, IN (US); Timothy Shipp, Seymour, IN (US); David B. Snyder, Greenwood, IN (US)

(73) Assignee: Cummins Inc., Columbus, IN (US)

(*) Notice: Subject to any disclaimer, the term of this patent is extended or adjusted under 35 U.S.C. 154(b) by 14 days.

(21) Appl. No.: 18/849,425

(22) PCT Filed: Mar. 31, 2023

(86) PCT No.: PCT/US2023/017151
§ 371 (c)(1),
(2) Date: Sep. 20, 2024

(87) PCT Pub. No.: WO2023/192615
PCT Pub. Date: Oct. 5, 2023

(65) Prior Publication Data

US 2025/0334091 A1 Oct. 30, 2025

Related U.S. Application Data

(60) Provisional application No. 63/326,492, filed on Apr. 1, 2022.

(51) Int. Cl.
*F02M 26/17* (2016.01)
*F01N 3/20* (2006.01)
(Continued)

(52) U.S. Cl.
CPC ........... *F02M 26/34* (2016.02); *F01N 3/2013* (2013.01); *F02D 41/024* (2013.01); *F02M 26/17* (2016.02);
(Continued)

(58) Field of Classification Search
CPC ...... F01N 3/027; F01N 3/2006; F01N 3/2013; F01N 3/2066; F01N 3/306; F01N 3/323;
(Continued)

(56) References Cited

U.S. PATENT DOCUMENTS 9,784,170 B2 10/2017 Ge et al.
10,066,535 B2 * 9/2018 Yi ........................ F01N 3/2066
(Continued)

FOREIGN PATENT DOCUMENTS

DE 10 2017 213 004 A1 1/2019
WO WO-2018/094420 A1 5/2018
(Continued)

OTHER PUBLICATIONS

PCT International Search Report and Written Opinion for Application No. PCT/US2023/017151 mailing date Aug. 24, 2023, 17 pages.

*Primary Examiner* — Dapinder Singh
(74) *Attorney, Agent, or Firm* — Foley & Lardner LLP

(57) ABSTRACT

A system, method, and apparatus for zero or low NOx emissions during a certain operating period are provided. A system can include an aftertreatment system including a catalyst. The system can include a pump coupled to at least an intake of an engine and an exhaust of the engine. The system can include a heater positioned downstream of the engine. The system can further include a controller coupled to at least the aftertreatment system, the pump, and the heater. During a warmup period for the aftertreatment system, the controller is configured to maintain the engine in an
(Continued)

off state, initiate the heater to increase a temperature of the aftertreatment system while the engine is in the off state, and control the pump to generate an airflow directed from the intake to the heater to increase the temperature of the aftertreatment system.

19 Claims, 5 Drawing Sheets

(51) Int. Cl.
*F02D 41/02* (2006.01)
*F02M 26/22* (2016.01)
*F02M 26/34* (2016.01)

(52) U.S. Cl.
CPC ..... *F02M 26/22* (2016.02); *F02D 2200/0802* (2013.01)

(58) Field of Classification Search
CPC .................. F01N 9/00; F01N 2240/16; F01N 2900/1602; F02B 37/10; F02B 41/0007; F02B 41/0055; F02B 41/024; F02B 41/0255; F02B 41/064; F02B 2200/0802; F02M 26/17; F02M 26/22; F02M 26/34; Y02T 10/12; Y02T 10/40
See application file for complete search history.

(56) References Cited

U.S. PATENT DOCUMENTS

| | | | | |
|---|---|---|---|---|
| 11,193,438 | B1 * | 12/2021 | Zhang | F01N 13/0097 |
| 11,220,941 | B2 * | 1/2022 | Kemmerling | F01N 3/0233 |
| 11,535,238 | B2 * | 12/2022 | Zhang | B60W 10/08 |
| 11,692,500 | B2 * | 7/2023 | Magnusson | F02D 41/024 123/568.11 |
| 2021/0363931 | A1 | 11/2021 | Younkins et al. | |
| 2021/0404362 | A1 | 12/2021 | Salemme | |
| 2022/0034283 | A1 * | 2/2022 | Andersson | F01N 3/22 |
| 2024/0295185 | A1 * | 9/2024 | Sundaravel Damotharan | F01N 11/00 |

FOREIGN PATENT DOCUMENTS

| | | | |
|---|---|---|---|
| WO | WO-2019/033134 | A1 | 2/2019 |
| WO | WO-2020/064679 | A1 | 4/2020 |
| WO | WO-2021/015613 | A1 | 1/2021 |
| WO | WO-2021/107931 | A1 | 6/2021 |
| WO | WO-2021/242228 | A1 | 12/2021 |

* cited by examiner

SYSTEMS AND METHODS FOR ZERO NOx EMISSIONS DURING AN OPERATING PERIOD

CROSS-REFERENCE TO RELATED APPLICATIONS

This application is a U.S. National Stage Application of International Application No. PCT/US2023/017151, filed Mar. 31, 2023, which claims the benefit of and priority to U.S. Provisional Patent Application No. 63/326,492, filed Apr. 1, 2022, titled "SYSTEMS AND METHODS FOR ZERO NOX EMISSIONS DURING AN OPERATING PERIOD," both of which are incorporated herein by reference in their entireties and for all purposes.

TECHNICAL FIELD

The present disclosure relates generally to a system for minimizing emissions from engines and, more particularly, to minimizing emissions during an operating, such as a warmup, period for an aftertreatment system or a component/system thereof.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which all engines must comply. Consequently, the use of exhaust aftertreatment systems on engines to reduce emissions is increasing. A common component in many of these exhaust aftertreatment systems is a selective catalytic reduction (SCR) system, which reduces a quantity of nitrous oxide (NOx) present in the exhaust gas by injecting a reductant into the flow of exhaust combined with the exhaust gas interacting with a catalyst. The catalyst reacts with the exhaust gas to form nitrogen and water.

SUMMARY

During a warmup period for an engine after a cold start (e.g., when the temperature or conversion efficiencies of an aftertreatment system including at least a catalyst is below a threshold, such as a threshold associated with high SCR conversion efficiencies), the hot exhaust gas from starting the engine during this period (which includes NOx) may pass/traverse through the aftertreatment system without getting reduced by the aftertreatment system (particularly, the SCR). Until the aftertreatment system reaches at least a predetermined temperature that results in a desirable SCR conversion efficiency, there may be a high quantity of tailpipe out NOx during the warmup period, such as above 0.5 gram per brake horsepower-hour (g/bhp-hr).

The systems and methods of the technical disclosure discussed herein generate/provide airflow to an exhaust aftertreatment system heater without starting the engine to prevent or avoid byproducts of the engine (e.g., tailpipe out NOx). For instance, the system can leverage an electric exhaust gas recirculation (EGR) pump (e.g., positive displacement roots blower) and the heater. In certain systems, an EGR pump can drive high-pressure EGR from an inlet of a turbine to an outlet of a compressor without requiring/needing the exhaust manifold pressure to be higher than the intake manifold pressure. In this implementation, using the EGR pump results in reduced pumping losses while driving the EGR. The EGR pump receives power or electricity from a battery, among other electrical generators or electrical storage components.

The systems and methods can control the EGR pump to generate an airflow in a reverse direction, such as from intake (e.g., outlet of a compressor) to an exhaust (e.g., an inlet of a turbine), while the engine is off (e.g., not operating or in an off-state). The EGR pump operates or functions as an air blower or airflow generator to provide zero NOx air into the heater. While radiating heat using the heater, the EGR pump provides the now-heated airflow to the aftertreatment system to warm up the catalyst and, more generally, the exhaust aftertreatment system. Subsequent to the aftertreatment system reaching a predetermined temperature, the system can turn on or start the engine with the aftertreatment system performing or likely performing at a desired SCR conversion efficiency. Accordingly, the system can turn off the EGR pump when the aftertreatment system (e.g., one or more components thereof) reaches a predetermined temperature or when turning on the engine. Alternatively or in addition, the system may switch the function of the EGR pump to drive high-pressure EGR after the aftertreatment system reaches the predetermined temperature.

One embodiment relates to a system for zero NOx emissions during an operating period, such as a warmup period for an exhaust aftertreatment system. The system includes an aftertreatment system including a catalyst, a pump coupled to at least an intake of an engine and an exhaust of the engine, a heater positioned downstream of the engine, and a controller coupled to at least the aftertreatment system, the pump, and the heater. During a warmup period for the aftertreatment system, the controller is configured to maintain the engine in an off state, initiate the heater to increase a temperature of the aftertreatment system while the engine is in the off state, and control the pump to generate an airflow directed from the intake to the heater to increase the temperature of the aftertreatment system.

Another embodiment relates to a system. The system includes an aftertreatment system including a catalyst, an electric motor coupled to an engine, a heater positioned downstream of the engine, and a controller coupled to at least the aftertreatment system, the electric motor, the engine, and the heater. During a warmup period for the aftertreatment system, the controller is configured to initiate the heater to increase a temperature in the aftertreatment system, and control the electric motor to cause the engine to spin to generate an airflow directed from an intake of the engine to the heater without combustion.

Still another embodiment relates to a system. The system includes an aftertreatment system including a catalyst, a turbocharger including a compressor and a turbine, a heater positioned downstream of an engine, and a controller coupled to at least the aftertreatment system, the turbocharger, the engine, and the heater. During a warmup period for the aftertreatment system, the controller is configured to maintain the engine in an off state, initiate the heater to increase a temperature of the aftertreatment system, and control at least one of the compressor or the turbine of the turbocharger to generate an airflow directed from an intake of the engine to the heater to increase the temperature of the aftertreatment system.

Yet another embodiment relates to a method. The method includes maintaining, by a controller coupled to at least an aftertreatment system, at least an engine in an off state during a warmup period for a system. The method includes initiating, by the controller, a heater of the system to increase a temperature of the system. The method includes controlling, by the controller, an air mover of the system to direct airflow from an intake of the engine to the heater to increase the temperature of the system.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Following below are more detailed descriptions of various concepts related to, and implementations of, methods and systems for zero NOx emissions during a warmup period for an engine and/or exhaust aftertreatment system. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the Figures generally, the various embodiments disclosed herein relate to systems, apparatuses, and methods for zero NOx emissions during a cold-started engine's warmup period. A key component in aftertreatment systems is a Selective Catalytic Reduction (SCR) system that utilizes a two-step process to greatly reduce harmful NOx emissions present in exhaust gas. First, a doser injects a reductant into the exhaust stream. This reductant may be a urea, diesel exhaust fluid (DEF), Adblue®, a urea water solution (UWS), an aqueous urea solution (e.g., AUS32, etc.), or another similar fluid that chemically binds to particles in the exhaust gas. Then, this mixture is run through an SCR catalyst that, when at a certain temperature, causes a reaction in the mixture that converts the harmful NOx particles into pure nitrogen and water. However, if the catalyst is not at the proper temperature (e.g., during a cold start), this conversion will not happen or will happen at a lower than desired efficiency. Therefore, maintaining the catalyst temperature at a desired temperature or temperature range is impactful on the conversion efficiency of the catalyst (e.g., a range of 0.02 g/bhp-hr for low NOx emissions).

Heating the catalyst from a cold soak (or cold start) presents some difficulty. One method of heating the SCR catalyst is to provide exhaust energy from the engine's hot exhaust gas. However, in those situations in which the engine is starting from a cold soak, the SCR catalyst is not yet at the desired temperature, so the hot exhaust gas being provided from the engine is not being properly treated or reduced. As such, harmful NOx and hydrocarbon gases are being released into the atmosphere at possibly unacceptable levels. In other words, trying to produce hot exhaust gas to heat the catalyst when the catalyst is not at a desired operating temperature may lead to the catalyst not reducing the harmful constituents in the exhaust gas during this warmup period. Therefore, it may be important to balance heating the SCR catalyst while avoiding emissions altogether to satisfy certain desired emissions standards (e.g., various the emissions regulations).

Figure 1:
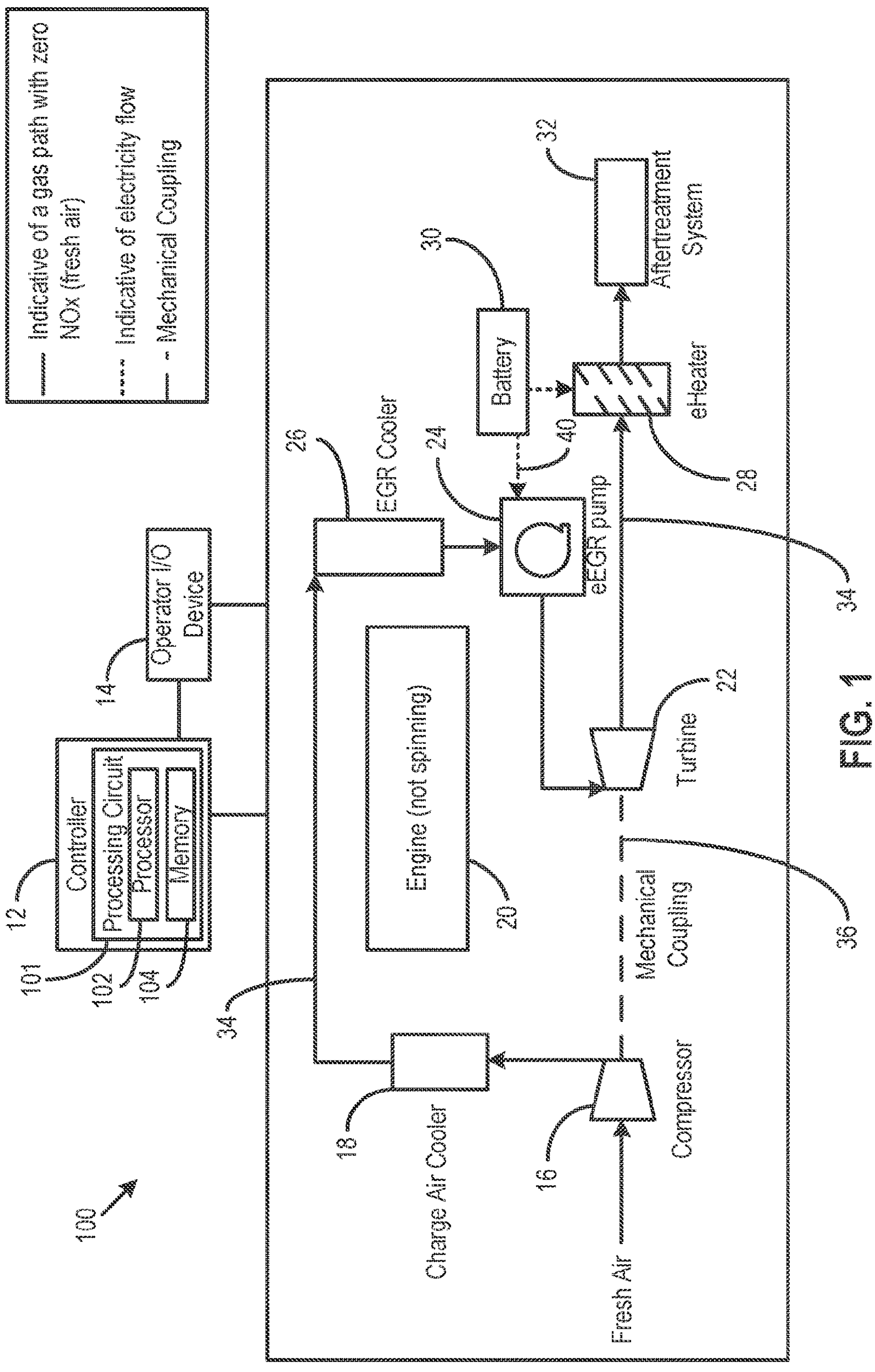
FIG. 1 is a schematic diagram of a system for low and in particular zero NOx emissions during a certain period, such as a warmup period for an exhaust aftertreatment system, via utilization of a spinning or motoring engine, according to an exemplary embodiment.

Referring now to FIG. 1, depicted is a schematic diagram of a system 100 for a zero NOx emissions operating condition, such as during an aftertreatment system warmup period, with an EGR circuit, according to an example embodiment. In the example shown, the system 100 is included in a vehicle. The vehicle can be any type of on-road or off-road vehicle including, but not limited to, line-haul trucks, mid-range trucks (e.g., pick-up truck, etc.), sedans, coupes, tanks, etc. In some embodiments, the vehicle may be an airplane, boat, locomotive, and/or other types of vehicles. In still other configurations, the system 100 may be included in a stationary system, such as a power generator or genset. Based on these configurations, various additional types of components may also be included in the vehicle, such as a transmission, one or more gearboxes, pumps, actuators, and so on The system 100 includes a controller 12 and an operator input/output (I/O) device 14 coupled to one or more components or devices of the system 100. The one or more components includes at least a turbocharger including a compressor 16 mechanically coupled to a turbine 22, a charge air cooler 18, an engine 20, an EGR circuit including at least an electric EGR (eEGR) pump 24 (sometimes referred to as a pump or an EGR pump) and an EGR cooler 26, an electric heater (eHeater) 28 (sometimes referred to generally as a heater), a battery 30, and an aftertreatment system 32. The one or more components, such as the aftertreatment system 32, the turbocharger, etc., are coupled to the engine 20. The system 100 can include multiple of components, such as multiple heaters 28, batteries 30, etc.

The controller 12 includes a processing circuit 101 including a processor 102, a memory 104, among other various circuits. The processor 102 may be implemented as a processor, an application specific integrated circuit (ASIC), one or more field programmable gate arrays (FPGAs), a digital signal processor (DSP), a group of processing components, or other suitable electronic processing components. The memory 104 (e.g., RAM, ROM, Flash Memory, hard disk storage, etc.) may store data and/or computer code for facilitating the various processes described herein. The memory 104 may be communicably connected to the processor 102, among other circuits of the processing circuit

101 and structured to provide computer code or instructions to the processor 102 for executing the processes described in regard to the controller 12 herein. Moreover, the memory 104 may be or include tangible, non-transient volatile memory or non-volatile memory. Accordingly, the memory 104 may include database components, object code components, script components, or any other type of information structure for supporting the various activities and information structures described herein.

Figure 2:
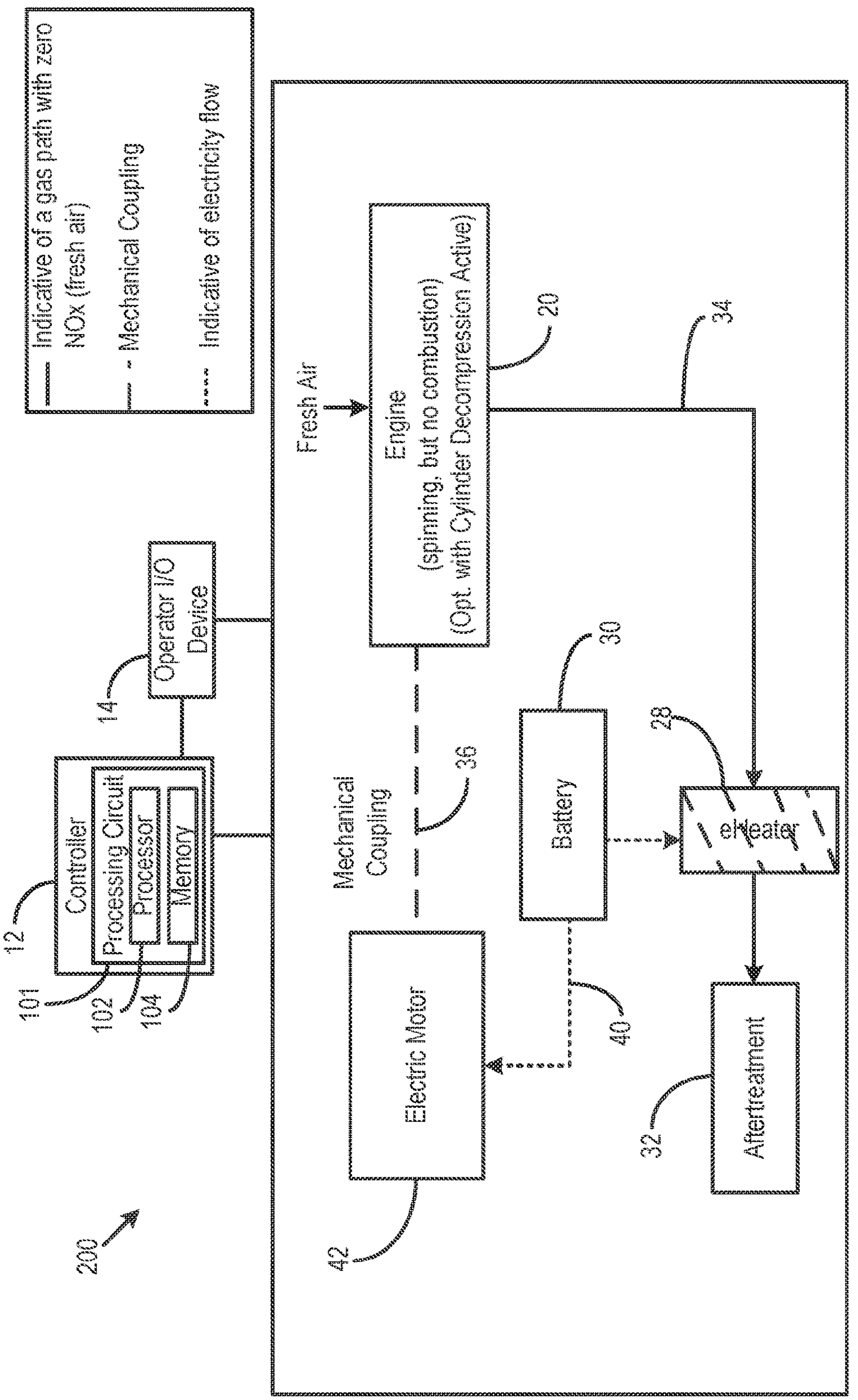
FIG. 2 is another schematic diagram of a system for a zero NOx emissions during a certain operating period, according to an exemplary embodiment.

The controller 12 monitors and acquires data indicative of operation of the system 100, among other systems when deployed to those systems (e.g., system 100, etc., in conjunction with at least FIG. 2, etc.). The controller 12 is coupled to one or more other components of the system 100, such as the operator I/O device 14, the engine 20, the heater 28, the compressor 16 and turbine 22 of the turbocharger, the EGR pump 24 and EGR cooler 26 of the EGR circuit, the battery 30, the aftertreatment system 32, among others. The controller 12 is structured to at least partly control at least one of the components.

It should be understood that a variety of sensors may be included with the system 100, among other systems (e.g., systems 100, etc.) discussed herein as individual components or a part of one or more components (e.g., the engine 20, turbocharger, aftertreatment system 32, etc.). For example, engine speed, torque, and temperature sensors may be coupled to the engine 20. As another example, fuel pressure, temperature, and flow rate sensors may be coupled to a fuel injection system and fuel source. As still another example, a mass airflow sensor may be coupled to an air intake channel/passage to acquire data indicative of the mass airflow into the engine 20. These sensors may be coupled to the controller 12. The controller 12 receives signals from one or more sensors indicative of the performance of components of the system 100 and uses the signals received to analyze the status of the system 100 (e.g., a signal indicative of starting the engine 20, a signal indicative of the temperature or operating efficiency of the aftertreatment system 32 below a threshold, etc.) and perform various operations or actions in response to these signals. The controller 12 may receive signals from the engine 20 regarding the performance and operation of the engine 20, such as the status or operations of the intake or exhaust valves of the engine 20.

The operator I/O device 14 enables an operator of the vehicle (or passenger or manufacturing, service, or maintenance personnel) to communicate with the vehicle and the controller 12. By way of example, the operator I/O device 14 may include, but is not limited to, an interactive display, a touchscreen device, one or more buttons and switches, voice command receivers, and the like. For example, information relating to the data/information acquired by the controller 12 or operations/commands provided by the controller 12 to control or manage one or more components (e.g., engine 20, EGR circuit, heater 28, aftertreatment system 32, etc.) may be provided to an operator or user via the operator I/O device 14. In some cases, the operator I/O device 14 updates the software components of the controller 12 or other components of the vehicle. The operator I/O device 14 may perform one or more features (e.g., controlling one or more components of the system 100) similar to the controller 12. The operator I/O device 14 may be coupled to components of the system 100.

The engine 20 may be any type of engine that generates exhaust gas, such as an internal combustion engine (e.g., compression ignition or a spark ignition engine that may utilize various fuels, such as natural gas, gasoline, diesel fuel, etc), a hybrid engine (e.g., a combination of an internal combustion engine and an electric motor), or any other suitable engine. In the example depicted, the engine 20 is structured as a compression-ignition engine that utilizes diesel fuel. The engine 20 includes one or more cylinders and associated pistons. In this regard, air from the atmosphere is combined with fuel, and combusted, to power or spin the engine 20. Combustion of the fuel and air in combustion chambers of the engine 20 produces exhaust gas that is operatively vented to an exhaust pipe and to the aftertreatment system 32.

The system may include one or more air movers (e.g., a device or system that moves air within the system). The directed air may be pure air and/or other types of gases (e.g., exhaust gas). The air mover may be a fan or any type of device configured to accelerate or produce airflow. The air mover may also be a turbo or turbocharger (or, supercharger). The turbocharger of the system 100 includes a compressor 16 and the turbine 22. The exhaust gas of the combustion is discharged to the turbine 22, which is mechanically coupled (e.g., mechanical coupling 36) to the compressor 16 through, for example, a shaft, and drives the compressor 16. In some cases, the system 100 includes a wastegate to enable part of the exhaust gas to bypass the turbine 22, resulting in less power transfer to the compressor 16. In some other cases, the system 100 includes a Variable Geometry Turbine (VGT) instead of the wastegate structured to flexibly modulate the power transferred to the turbine 22 by changing a position of a valve of the VGT. A combination of bypass and turbine flow enters the aftertreatment system 32 for aftertreatment before being released to the atmosphere. The compressor 16 may compress air before the air is aspirated into the charge air cooler 18 or the engine 20 through an air intake passage (e.g., providing fresh air 34 or zero NOx airflow to the engine 20), thereby increasing the temperature and pressure of the airflow. The charge air cooler 18 is positioned downstream of the compressor 16 and is structured to reduce the temperature and increase a density of the intake air, thereby improving efficiency by reducing loss due to the increase in temperature of the air from compression. The operation of the turbocharger also affects exhaust energy output from the system 100.

As the exhaust gas drives the turbine 22 to rotate, the compressor 16 compresses the air supplied to the combustion chambers of the engine 20. Exhaust gas can be diverted from the turbine 22 via, for example, a wastegate to reduce the power transferred to the compressor 16, thereby reducing the rate at which the air flow is supplied to the combustion chambers of the engine 20. Otherwise, in this case, the wastegate can be closed to direct all or mostly all of the exhaust gas to the turbine, increasing the amount of power transferred to the compressor 16 and increasing the rate of airflow into the engine 20.

The system 100 includes an EGR circuit or system including the EGR pump 24 (sometimes referred to as pump 24) and EGR cooler 26. The EGR pump 24 can be an electric EGR pump 24 powered by a battery 30 (e.g., labeled as electricity flow 40), an alternator, and/or other power sources. The pump 24 is coupled to the EGR cooler 26 and the exhaust pipe (e.g., exhaust channel, conduit, passage, etc.) of the engine 20. The EGR cooler 26 is coupled to the intake pipe (e.g., channel, conduit, passage, etc.) of the engine 20. The EGR circuit includes at least one EGR valve positioned between the intake passage of the engine 20 and the EGR cooler 26. The EGR valve may be controlled by the controller 12 and have a variety of structural configurations (three-way valve, etc.). The EGR valve may control the flow of EGR into the engine 20. In certain embodiments, the EGR circuit may include additional EGR valve(s) positioned between the exhaust passage and the pump 24.

The controller 12 is configured or structured to control or transmit instructions to the component(s) of the EGR circuit. The controller 12 may be structured as one or more electronic control units (ECUs) (e.g., transmission control units, aftertreatment system control units, engine control units/modules, etc.). Typically, the controller 12 can control the pump 24 to drive high-pressure EGR from the inlet of the turbine 22 (or from the outlet passage of the engine 20) to the outlet of the compressor (or outlet of the charge air cooler 18 or inlet passage of the engine 20), without needing the exhaust manifold pressure to be higher than the intake manifold pressure. The controller 12 can provide instructions to adjust the EGR valve within the EGR circuit to increase or decrease the amount of exhaust gas being redirected to the engine 20, as shown in system 100. To power the pump 24, the controller 24 provides instructions to the battery 30 to supply power to the pump 24.

Figure 4:
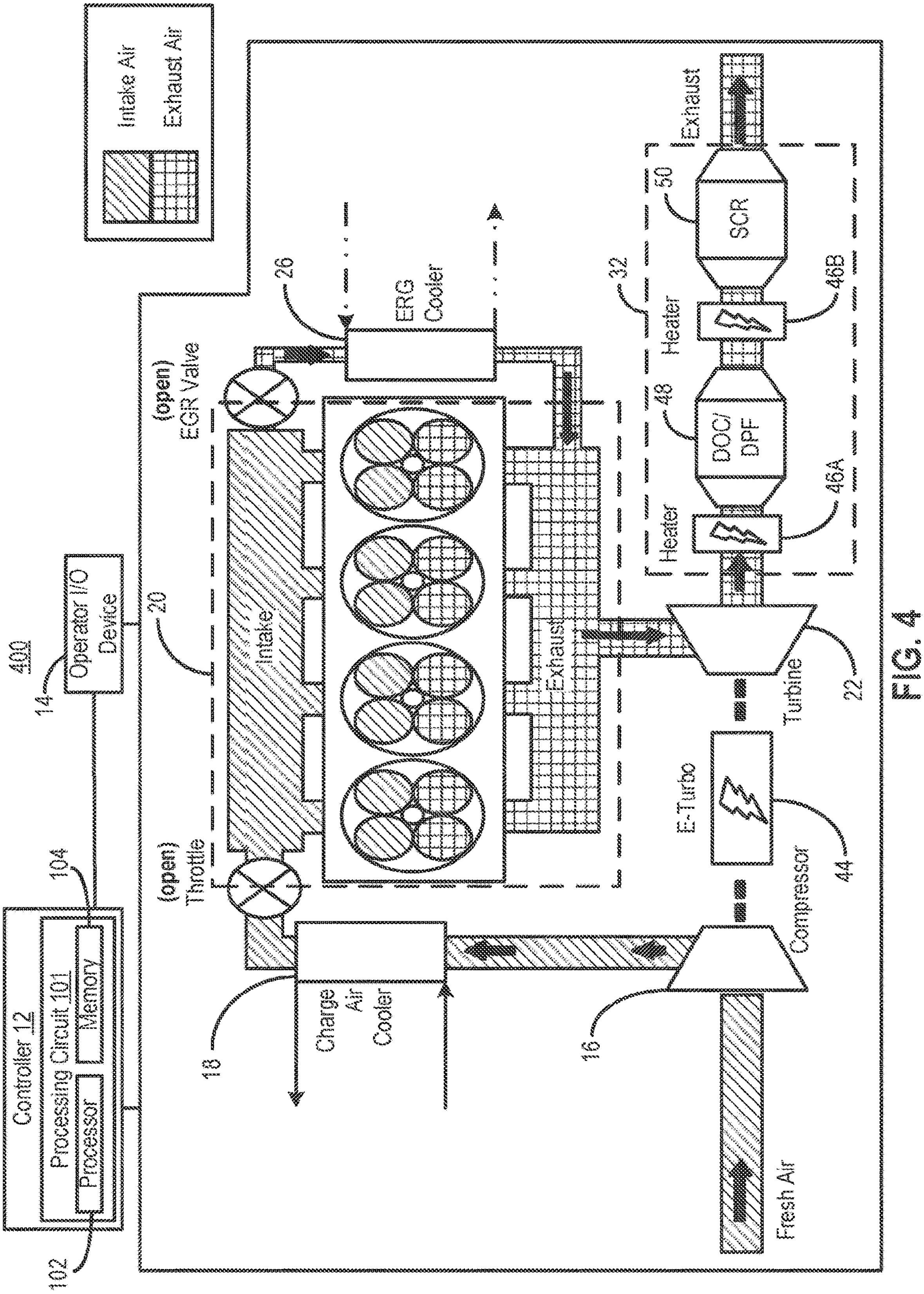
FIG. 4 is a schematic diagram of a system for zero NOx emissions during a certain operating period, according to an exemplary embodiment.

The aftertreatment system 32 includes various systems or components to reduce emissions, such as one or more catalysts, one or more heaters, at least one injector, at least one doser, among others. Referring to FIG. 4 in combination with FIG. 1, the aftertreatment system 32 includes a selective catalytic reduction (SCR) system (e.g., shown as SCR 50 in conjunction with FIG. 4) structured to receive exhaust gas in a decomposition chamber (e.g. reactor, reactor pipe, etc.), in which the exhaust gas is combined with a reductant, which may be, for example, urea, diesel exhaust fluid (DEF), Adblue®, a urea water solution (UWS), an aqueous urea solution (e.g., AUS32, etc.), or other similar fluids. An amount of reductant is metered by a dosing system. The decomposition chamber includes an inlet in fluid communication with an EGR system to receive the exhaust gas containing NOx emissions and an outlet for the exhaust gas-reductant mixture to flow to an SCR catalyst (not shown). The SCR catalyst is configured to assist in the reduction of NOx emissions by accelerating a NOx reduction process between the reductant and the NOx of the exhaust gas into diatomic nitrogen, water, and/or carbon dioxide. The SCR catalyst may be made from a combination of an inactive material and an active catalyst, such that the inactive material, (e.g. ceramic metal) directs the exhaust gas towards the active catalyst, which is any sort of material suitable for catalytic reduction (e.g. base metals oxides like vanadium, molybdenum, tungsten, etc. or noble metals like platinum). If the SCR catalyst is not at or above a certain temperature, the rate of the NOx reduction process is limited and the SCR system will not operate at a desired level of efficiency, such as to meet various regulations. In some embodiments, this certain temperature is a temperature range corresponding to 250-300° C. In other embodiments, the certain operating temperature corresponds with the conversion efficiency of the SCR catalyst meeting or exceeding a predefined conversion efficiency threshold for the SCR.

In some implementations, the aftertreatment system 32 includes a diesel oxidation catalyst (DOC) that is structured to receive a flow of exhaust gas and to oxidize hydrocarbons and carbon monoxide in the exhaust gas. In some cases, the aftertreatment system 32 includes a diesel particulate filter (DPF) structured to remove particulate matter, such as soot, from exhaust gas flowing in the exhaust gas conduit system. In some implementations, the DPF may be omitted. The spatial order of the catalyst elements may be different. The DOC and/or the DPF may correspond to the DOC/DPF 48 as shown in conjunction with FIG. 4. In some embodiments and depending on the system architecture, the aftertreatment system 32 may further include a three-way catalyst (not shown) that is structured to receive a flow of exhaust gas and to reduce NOx into nitrogen and water and to oxidize hydrocarbons and carbon monoxide in the exhaust gas (e.g., perform the combined functions of the SCR catalyst and of the DOC).

The heater 28 is a heating element structured to output heat in order to increase the temperature of the exhaust gas and/or aftertreatment system component temperatures (e.g., SCR system temperature, DPF temperature, etc.). In some embodiments, the heater 28 outputs heat to one or more components of the aftertreatment system 32 via an airflow. The heater 28 can be a separate component from the aftertreatment system 32 or be a part of the aftertreatment system 32. The heater 28 may have any of various designs (e.g., a resistive coil heater like shown or another type of heater). The heater 28 may be a convective heater to heat the exhaust gas passing through it or to heat the catalyst (or another component) directly (e.g., via conduction), for example. As shown in FIG. 1, the heater 28 is positioned before the aftertreatment system 32. However, the heater 28 may be positioned in other locations of the system 100, such as within the aftertreatment system 32, etc. The heater 28 is powered by a battery 30 (e.g., labeled as electricity flow 40) or, in some embodiments, an alternator (or another electronic source, such as a capacitor) of the system 100. The controller 12 provides instructions to the battery 30 to provide power to the heater 28. Heating the exhaust gas increases efficiency and the success of the SCR catalyst in cold situations (e.g., ambient temperatures at or below the freezing temperature of water). The heater 28 is controlled by the controller 12 to turn the heater 28 on or off as further described below. When the heater 28 is "on" or "activated," the heater 28 outputs heat, and when the heater 28 is "off" or "deactivated," the heater 28 ceases heat output. With the heater 28, the system 100 can warm up the aftertreatment system 32 before starting the engine 20.

Typically, a flow of gases flows through the heater 28 to increase the temperature of the aftertreatment system 32 (or, certain components of the aftertreatment system 32). In this case, the exhaust gas from the engine 20 is used as the flow of gases, which is heated using the heater 28 to warm the aftertreatment system 32 to a temperature associated with a desired NOx reduction efficiency or to another desired temperature. However, to generate a flow, typically, the engine 20 is started to burn fuel during the warmup period (e.g., a period of time from starting the engine 20 to when the aftertreatment system 32 reaches a predefined operating efficiency or temperature), which causes slippage of the exhaust products (e.g., NOx or other byproducts from the engine 20 in path 38) from the system (e.g., not zero NOx emissions or other undesired emissions) due to the low temperature of the aftertreatment system 32 during the warmup period.

To reduce emissions during a warmup period, the EGR circuit can be leveraged by the controller 12 to provide fresh air from the intake passage through the heater 28 to the aftertreatment system 32 for warming the aftertreatment system 32, such as shown in FIG. 1 without allowing combustion to occur in the engine. As shown, the system 100 generates airflow without exhaust products (e.g., NOx, etc.), for example, generating the airflow without spinning or using the engine 20 (i.e., operating the engine in only a motoring condition).

In operation, the controller 12 can receive a signal (e.g., information, data, etc.) indicative of a command to start the engine 20. For example, an operator may turn/rotate an ignition key, press an ignition button (push-button), and/or provide any other input that ignites or starts the engine 20. However and in contrast to typical operation, the controller 12 does not immediately start the engine but instead may activate the heater 28 and cause fresh air to be heated by the heater 28 and distributed to the aftertreatment system 32 in order to heat the aftertreatment system 32 to a desired operating temperature before the engine 20 ignites. In order to provide a seamless starting procedure, the controller 12 may activate the I/O device 14 to display a message indicating what is happening and that the engine will be started soon in order for the operator to understand that this is normal. In some embodiments, the I/O device 14 may display a message that enables this procedure to be bypassed based on receiving an input. In other embodiments, the process described herein may not be bypassed.

In operation, the controller 12 determines whether the aftertreatment system 32 (e g, one or more components, such as the SCR catalyst temperature, DOC temperature, DPF temperature, another catalyst temperature, etc.) satisfies a predetermined temperature threshold (e.g., 250C, 200C, among others). The temperature of the one or more components is detected or monitored by one or more sensors. The controller 12 receives sensor signals to determine or identify the temperature of one or more components of the aftertreatment system 32. The controller 12 performs the determination before turning on or enabling a turning on of the engine 20. The controller 12 compares the measured, received, and/or determined temperature to a threshold. The threshold may be preconfigured by the manufacturer of the vehicle or by a service center during maintenance. If the aftertreatment system 32 is operating at, above, or near (e.g., 1%, 2%, 5%, etc., deviation) the predetermined temperature, the controller 12 can proceed to normal vehicle startup procedure, including starting the engine 20. Otherwise, if the operating temperature is below the threshold, the controller 12 maintains the engine 20 in an off-state (prevents the engine 20 from starting or maintain the engine 20 spinning). A duration from an instance or a time (e.g., a first instance) that the controller 12 receives a signal to start the vehicle to another instance (e.g., a second instance) when the aftertreatment system 32 reaches or maintains the predefined temperature may be referred to as a warmup period. In this regard and as used herein, the phrase "warmup period" refers to an instance or time (e.g., a first instance) stemming from when a command to start the engine is received to when the engine is allowed to start/ignite. The warmup period may correspond with a temperature threshold for one or more components of the aftertreatment system 32 (e.g., the SCR) being reached. Thus, when the temperature threshold is reached or obtained, the engine 20 is allowed to start and the warmup period ends.

In this implementation, the controller 12 leverages the EGR circuit to generate airflow for heating the aftertreatment system 32 during the warmup period. To generate the airflow, the controller 12 controls or powers the pump 24 (e.g., bidirectional) in a direction opposite to system 100 (e.g., a reverse direction), thereby generating and directing airflow from the intake passage to the exhaust passage of the engine 20. From the exhaust passage, the generated airflow can traverse to the turbine 22, through the heater 28 to heat the fresh air 38 from the EGR circuit, and accordingly warm up the aftertreatment system 32. The controller 12 may activate or turn on the heater 28 before, concurrent to, or after activating the pump 24. Accordingly, the controller 12 is structured to control the pump 24 to function as an air blower or airflow generator, sending clean air (e.g., without NOx or other exhaust products) from the compressor 16 or intake passage of the engine 20 to the turbine 22 or the exhaust passage of the engine 20.

The controller 12 may maintain this process throughout the warmup period until the aftertreatment system 32 reaches preconfigured temperature. Subsequent to satisfying or reaching a temperature threshold, the controller 12 can start or turn on the engine 20. Also, the controller 12 can turn off the pump 24 (e.g., at least for usage as an airflow generator). Since the engine 20 is on and the aftertreatment system (or, at least one desired component/system thereof) is at the desired temperature, the controller 12 uses the hot exhaust from the engine 20 to at least maintain, or in some cases further increase the temperature of the aftertreatment system 32.

In certain aspects, the controller 12 may turn off the heater 28, such that the exhaust gas serves as the flow. While operating the engine 20, the controller 12 controls one or more components of the system 100 to reduce NOx or other emissions produced from the engine operation, such as activating reductant doser, hydrocarbon injector, or certain catalysts of the aftertreatment system 32, controlling the EGR pump 24 to direct a portion of the exhaust gas to the inlet of the engine 20, among others. Beneficially and as shown in FIG. 1, the controller 12 controls the one or more components of the system 100 to heat the aftertreatment system 32 during the warmup period without producing NOx (e.g., since the engine 20 is off).

Referring now to FIG. 2, depicted is a schematic diagram of a system 200 for zero NOx emissions during a certain operating period, such as an aftertreatment system warmup period, according to another exemplary embodiment. The system 200 includes one or more components of at least system 100, such as the engine 20, the heater 28, the battery 30, and the aftertreatment system 32. In this regard, similar reference numbers are used to denote similar components/systems. The one or more components of system 200 may perform similar features or functionalities as components of the other systems. For instance, the battery 40 supplies charge and/or current to the heater 28 to generate heat, where airflow is directed through the heat to warm up the aftertreatment system 32 at least during a warmup period. In some cases, the engine 20 can include or perform one or more features of one or more components of system 100, such as a turbocharger (e.g., or other types of air movers), EGR circuit/system (e.g., with or without an EGR pump 24), among others.

Relative to FIG. 1 and as shown, the engine 20 of system 200 is part of a hybrid powertrain. In this regard, the system 200 includes an electric motor 42 (sometimes referred to as motor 42) mechanically coupled (labeled as mechanical coupling 36) to the engine 20. The motor 42 is powered by the battery 30 (e.g., shown as electricity flow 40), an alternator, and/or another power source. The motor 42 receives charge and/or current from the battery 40 based on a command from the controller 12. The motor 42 of system 200 is used to spin the engine 20 (e.g., cylinder(s) of the engine 20) to generate airflow. In this example, the engine 20 acts as an air pump-intaking fresh air and pumping the fresh air out into the exhaust aftertreatment system. The controller 12 disallows combustion to occur by, for a spark-ignited engine, disabling the spark plug and for a compression-ignition engine, disabling fuel injection. In some embodiments, the controller 12 may also disable fuel injection in a spark-ignited engine to prevent combustion.

During a warmup period, the controller 12 controls the motor 42 powered by the battery 30 to spin the engine 20 without combustion. Without combustion, exhaust gas is not produced (i.e., no NOx emissions). The spinning of the engine 20 by the motor 42 can drive or propel the vehicle. Otherwise, the controller 12 can maintain the position of the vehicle while spinning the engine 20 (e.g., heat the aftertreatment system 32 while stationary). In some cases, the engine 20 may not be used to move the vehicle. For example, the controller 12 may command the transmission to be put into neutral or park so that motive power from the engine spinning is not transmitted to the driveline to move the vehicle. In other embodiments, concurrent to or while spinning the engine 20, the controller 12 can control the motor 42 to directly propel or drive the vehicle (e.g., during or after the warmup period). The engine 20 can remain coupled to the motor 42 throughout the warmup period. Hence, the controller 12 controls the motor 42 to assist the engine 20 to pump fresh air to the aftertreatment 32 through the heater 28, thereby allowing warmup of the catalyst without producing NOx. In this case, the engine 20 performs the features (e.g., airflow generation) of a pump (e.g., EGR pump 24).

Figure 3:
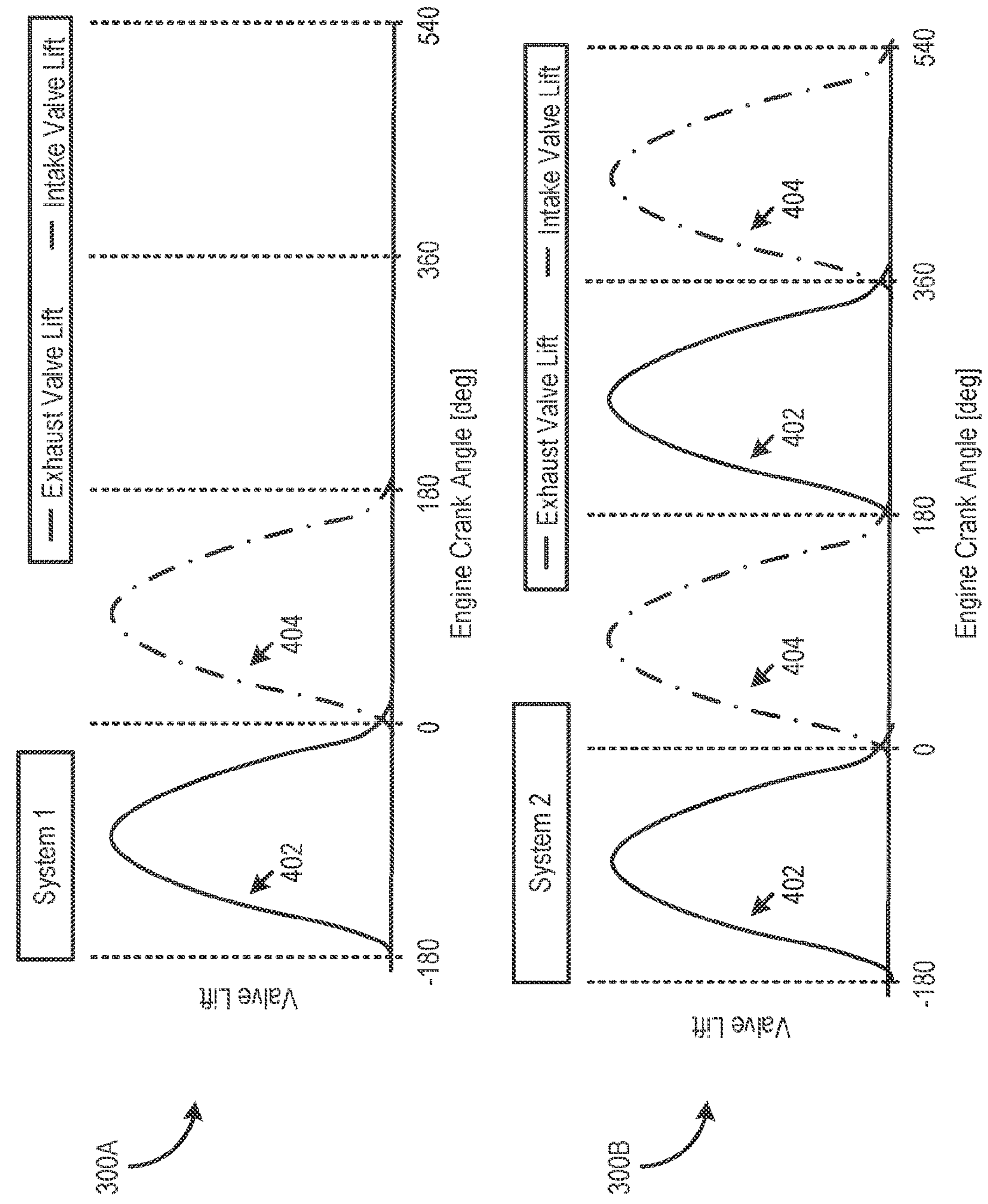
FIG. 3 shows graphs of valve profiles for a zero NOx warmup emissions period using an engine as a pump, according to an exemplary embodiment.

In some implementations, the controller 12 leverages or utilizes cylinder decompression technology on the engine 20. Referring now to FIG. 3, graphs 300A-B of valve profiles for zero NOx warmup using an engine 20 as a pump are shown, according to exemplary embodiments. The graphs 300A-B shows the valve lifts for an exhaust valve (e.g., exhaust valve lift 302) and an intake valve (e.g., intake valve lift 304) throughout the rotation of the engine crank over two intervals/cycles (e.g., two rotations or two reciprocating motions of the engine cylinder). Graph 300A shows a valve profile for certain systems, and graph 300B shows a valve profile for a system (e.g., system 200) with active cylinder decompression. Cylinder decompression refers to a reduction of cylinder compression at a desired speed (low rotations per minute) for reducing the amount of force for starting the engine 20, such as achieved by opening an exhaust valve for a predetermined timeframe on the compression stroke of the piston, thereby partially venting the combustion chamber. Although the engine 20 can be used as a pump to generate airflow, motoring of the engine 20 by the electric motor 42 in certain systems may result in wasted energy due to an incompatible or unoptimized valve profile for using the engine 20 for generating airflow. For example, certain systems may use or be configured with a valve profile of graph 300A (e.g., four-stroke cycle). With this valve profile, the engine 20 receives and outputs airflow (e.g., generate airflow) every other rotation of the engine crank (e.g., crankshaft). In this example, the valve profile supports or is configured for the compression and combustion process Hence, using this valve profile (e.g., for a four-stroke cycle) may waste energy on two out of every four strokes, since no combustion occurs in the engine 20 during the warmup period.

In another example, the controller 12 configures the engine 20 by adjusting the lift of the intake and exhaust vales based on or using a valve profile shown in graph 300B. The controller 12 implements or uses cylinder decompression technology for the engine 20 to reduce the amount of energy needed to spin the engine 20 to generate airflow, such as described in the valve profile of graph 300A. In this case, for every 180 degrees (e.g., half a rotation of the engine crank), one of the exhaust valve or the intake valve can open and close, thereby enabling airflow through the engine for every rotation of the crank. Hence, for example, the valve profile of system 2 (e.g., with cylinder decompression active) generates twice the airflow for the same amount of energy or reduces the amount of energy by half for generating the airflow compared to the valve profile of system 1.

In certain implementations, the controller 12 can use other sets of engine valve profiles for generating and enabling the airflow using the engine 20 (e.g., varying exhaust and intake valve control, the magnitude of the valve lifts, etc.). The valve profiles can be used to reduce the motoring torque of the engine 20 (e.g., pumping and/or friction torque) while allowing/enabling airflow through the engine 20 to heat the aftertreatment system 32. In some cases, the controller 12 can use one or more variable valve actuation (VVA) technologies to configure, obtain, update, or achieve the valve profile, such as shown in graph 300B to reduce energy consumption for the engine 20 to generate airflow.

FIG. 4 shows a schematic diagram of a system 400 for zero NOx emissions during a certain operating period, such as a warmup period for an aftertreatment system, according to an example embodiment. The system 400 includes one or more components similar to at least one of systems 100 or 200, such as the controller 12, operator I/O device 14, charge air cooler 18, engine 20, EGR cooler 26 of the EGR circuit/system (e.g., with or without the pump 24), and aftertreatment system 32. Similar reference numbers are used to refer to similar components/systems/devices. The system 400 also includes an electric turbocharger 44 (sometimes referred to as turbocharger 44) including at least the compressor 16 and the turbine 22. The turbocharger 44 is powered by a power source, such as by the battery 30, alternator, among others As shown, the aftertreatment system 32 includes DOC/DPF 48, SCR 50, and one or more heaters 46 (e.g., heater 46A positioned at the inlet of the aftertreatment system 32 and heater 46B positioned between the DOC/DPF 48 and SCR 50). The one or more heaters 46 can be at any position or location within the aftertreatment system 32. In some cases, the heater(s) 46 can be located or positioned outside of the aftertreatment system 32, such as between the turbine 22 and the aftertreatment system 32.

The controller 12 maintains the engine 20 in an off state at least during the warmup period to avoid or prevent exhaust products from being produced (e.g., unless receiving instructions from the operator I/O device 14 to drive the vehicle during the warmup period). The off state refers to when no fuel is injected into the engine 20, such that the exhaust products are prevented from being produced, for example. The system 400 uses the turbocharger 44 to generate airflow or as a pump. For example, the controller 12 opens or maintains at least a portion of the EGR valve of the EGR system. The opening of the EGR valve allows an airflow path from the intake passage to the exhaust passage of the engine 20 (e.g., around the cylinders without the engine spinning). The controller 12 activates the turbocharger 44, such as spinning or driving the turbine 22 and/or compressor 16 to generate airflow from the intake to exhaust of the engine 20. Hence, the controller 12 can generate the airflow through the one or more heaters 46 (e.g., activated before or during activation of the turbocharger 44) and to the one or more catalysts (e.g., DOC/DPF 48 or SCR 50) of the aftertreatment system 32 using the turbocharger 44.

In some implementations, the controller 12 via the system 400 provides one or more airflow paths via the engine 20. For example, the controller 12 can control the engine 20 to rotate. The controller 12 then stops the engine rotation with at least one cylinder having both the intake valve and the exhaust valve open (e.g., during valve overlap). Hence, the controller 12 can open at least one airflow path via the engine valves. In some other implementations, the system 400 includes a mechanism to actuate one or more engine valves to provide at least one flow path through at least one engine cylinder. For instance, the mechanism may include an actuator that holds open both (at least partially) the intake and exhaust valves (e.g., a few millimeters). The system 400 may include the EGR system with the valve open to provide multiple flow paths with the path(s) through at least one engine cylinder. In some cases, the system 400 may not include the EGR system or the EGR valve may be closed when the engine cylinder(s) provides the flow path(s). The order of the operations of the systems or the one or more components of the systems discussed herein can be performed in the order sequence(s) of the respective systems or in any order.

In certain implementations, the system 400 includes an EGR pump 24 as part of the EGR system. In this case, the system 400 may use the pump 24 to assist with generating the airflow. For instance, the controller 12 activates both the pump 24 and the turbocharger 44 to generate the airflow through at least one of the EGR circuit path or one or more paths of the engine cylinder(s).

In some implementations, the system 400 uses the turbocharger 44 with other implementations to generate the airflow, such as spinning the engine 20 using the electric motor 42. For example, the controller 12 activates the turbocharger 44 and controls the electric motor 42 to spin the engine 20 without combustion. The cylinder decompression may be active. Accordingly, the controller 12 can include multiple airflow generators (e.g., turbocharger 44 and engine 42 used as a pump) to generate the airflow to heat the aftertreatment system 32 during the warmup period. In some cases, the controller 12 may also use other combinations of components to generate airflows, such as the pump 24 with spinning the engine 20, or the pump 24, the engine 20, and the turbocharger 44 simultaneously generating airflow from the intake to the exhaust. Activating multiple airflow generators can increase the amount of airflow to the heater 28 or 46 compared to using each component independently to generate the airflow.

Technically and beneficially, the systems and methods described herein generate airflow through one or more heaters 28 (e.g., eHeater) to increase the temperature of the aftertreatment system 32 without introducing exhaust product during at least the warmup period. By increasing the temperature of the aftertreatment system 32 before ignition of the engine 20 (e.g., burning fuel), the systems and methods described herein avoid the production of potentially harmful byproducts (e.g., NOx) from the engine 20 during lower conversion efficiency (e.g., low temperature) of the catalyst (e.g., SCR catalyst) operating times of the aftertreatment system 32.

Figure 5:
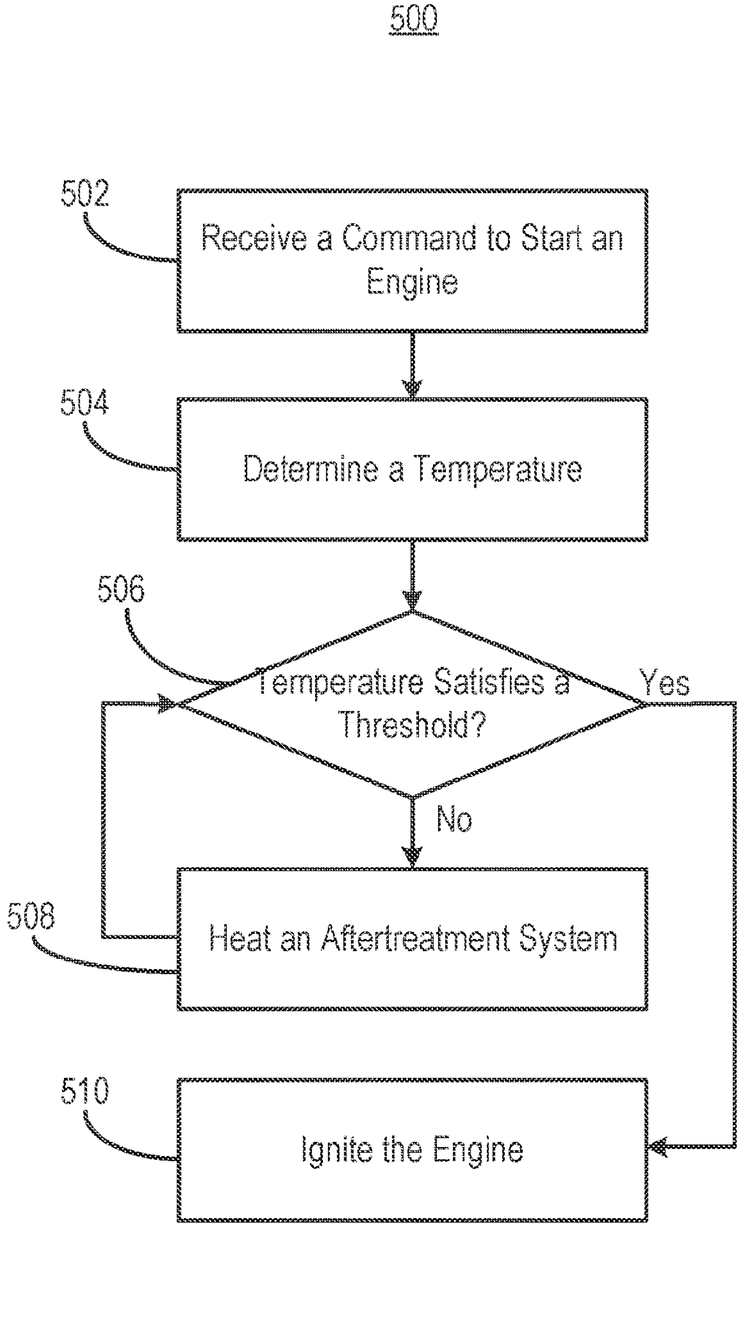
FIG. 5 is a flow diagram of a method for zero NOx emissions during a certain period, such as a warmup period for an exhaust aftertreatment system, according to an exemplary embodiment.

Referring now to FIG. 5, a flow diagram of a method 500 for zero NOx emissions during a certain operating period, such as a warmup period, is shown according to an example embodiment. In operation of method 500, a command to start the engine is received by the controller 12 (e.g., via the I/O device, turning of a key, etc.) (502). The controller 12 receives a temperature regarding the aftertreatment system 32 (e.g., SCR) from one or more sensors or determines the temperature of the aftertreatment system 32 based on signals from the one or more sensors (504). The controller 12 determines whether the aftertreatment system 32 satisfies a predefined desired temperature (e.g., a predetermined temperature threshold) based on a comparison of the received temperature and the predefined desired temperature (506). Satisfying the desired temperature can include the measured temperature being greater than or equal to the desired temperature (or in some cases below the desired temperature depending on the configuration). The predefined temperature threshold may be a temperature of a catalyst that is associated with desired operating conditions (e.g., NOx conversion efficiency). If the temperature does not satisfy the temperature threshold (e.g., below the threshold), the controller 12 provides a notification to the operator via the I/O device 14 that heating of the aftertreatment system 32 is about to occur and that normal ignition will occur shortly after.

Accordingly, the controller 12 initiates heating of the aftertreatment system 32 (508). The controller 12 activates at least one heater 28 upstream or within a portion of the aftertreatment system 32. The controller 12 generates airflow through the heater 28 to carry warm or hot air to one or more components of the aftertreatment system 32. The controller 12 generates airflow by activating a pump 24, spins the engine 20 without combustion using an electric motor 42, utilizes a valve profile to increase airflow through the cylinders, and/or initiate the turbocharger 44, among other variations or implementations described herein. The controller 12 receives temperature data during operation. When the temperature is at or above the predefined temperature (e.g., satisfies the temperature threshold), the controller 12 enables ignition to occur in the engine (510). This enables zero exhaust gas to be emitted during a warmup period for the aftertreatment system 32 or a component thereof which may mitigate emissions for the vehicle.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in certain Figures, it should be understood that the controller 12 may include any number of circuits for completing the functions described herein. For example, the activities and functionalities of individual circuits of the systems may be combined in multiple circuits or as a single circuit. Additional circuits with additional functionality may also be included. Further, the controller 12 may further control other activity beyond the scope of the present disclosure.

As mentioned above and in one configuration, the "circuits" may be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A system, comprising:

an aftertreatment system including a catalyst;

an exhaust gas recirculation (EGR) circuit comprising an EGR pump, wherein the EGR pump is coupled to at least an intake of an engine and an exhaust of the engine;

a heater positioned downstream of the engine; and a controller coupled to at least the aftertreatment system, the EGR pump, and the heater, wherein during a warmup period for the aftertreatment system, the controller is configured to:

receive a signal indicative of a command to start the engine;

receive a temperature regarding the aftertreatment system or a component thereof;

in response to the temperature regarding the aftertreatment system or the component thereof being less than a threshold, maintain the engine in an off state despite receiving the signal indicative of the command to start the engine;

initiate the heater to increase a temperature of the aftertreatment system while the engine is in the off state; and control the EGR pump to direct an airflow from the intake through the EGR circuit to the exhaust and the heater such that the airflow bypasses the engine and the heater heats the airflow to increase the temperature regarding the aftertreatment system or the component thereof.

2. The system of claim 1, wherein the warmup period is defined as a period of time from a first instant of receiving a signal to start the engine to a second instance when the catalyst reaches a predetermined temperature.

3. The system of claim 1, further comprising:

an EGR cooler positioned upstream of the EGR pump and positioned at or downstream of the intake of the engine;

a turbine positioned downstream of the EGR pump and the engine and positioned upstream of the heater; and a compressor positioned upstream of the EGR pump and the intake of the engine.

4. The system of claim 1, wherein at least the EGR pump and the heater are coupled to at least one battery structured to provide power to at least the EGR pump and the heater.

5. The system of claim 4, wherein to initiate the heater and control the EGR pump, the controller is configured to:

send a command to the at least one battery to supply power to the heater to increase the temperature of the aftertreatment system, and to supply power to the EGR pump to generate the airflow directed from the intake to the heater to increase the temperature of the aftertreatment system.

6. The system of claim 1, wherein to maintain the engine in the off state, the controller is configured to prevent combustion of the engine during the warmup period for the aftertreatment system.

7. A method, comprising:

receiving, by a controller coupled to at least an aftertreatment system, a signal indicative of a command to start an engine coupled to the aftertreatment system;

receiving, by the controller, a temperature regarding the aftertreatment system or a component thereof;

maintaining, by the controller, at least the engine in an off state during a warmup period in response to the temperature regarding the aftertreatment system or the component thereof being less than a threshold despite receiving the signal indicative of the command to start the engine;

initiating, by the controller, a heater of the system to increase the temperature regarding the aftertreatment system or the component thereof while the engine is in the off state; and controlling, by the controller and during the warmup period while the engine is in the off state, an air mover to direct airflow from an intake of the engine to the heater by bypassing the engine to increase the temperature regarding the aftertreatment system or the component thereof.

8. The method of claim 7, wherein the warmup period is defined as a period of time from a first instant of receiving the signal to start the engine to a second instance when a catalyst of the aftertreatment system reaches a predetermined temperature.

9. The method of claim 7, further comprising:

opening, by the controller coupled to an exhaust gas recirculation (EGR) circuit, a valve of the EGR circuit to cause the airflow to move from the intake to the heater via the EGR circuit.

10. The method of claim 7, further comprising:

opening, by the controller, at least one intake valve and at least one exhaust valve of at least one cylinder of the engine to cause the airflow to move from the intake to the heater via the at least one cylinder of the engine.

11. The method of claim 7, further comprising:

actuating, by the controller, one or more valves of the engine to provide at least one path for the airflow from the intake to the heater.

12. A controller, comprising:

one or more processors coupled to at least one memory, the one or more processors to operable to:

receive a signal indicative of a command to start an engine;

receive a temperature regarding an aftertreatment system or a component thereof;

in response to the temperature regarding the aftertreatment system or the component thereof being less than a threshold, maintain the engine in an off state despite receiving the signal indicative of the command to start the engine;

activate a heater to increase the temperature regarding the aftertreatment system or the component thereof; and control, while the engine is in the off state, an air mover to generate an airflow directed from an intake of the engine to the heater bypassing the engine to increase the temperature regarding the aftertreatment system or the component thereof.

13. The controller of claim 12, wherein the one or more processors are operable to maintain the engine in the off state during a warmup period for the aftertreatment system.

14. The controller of claim 13, wherein the warmup period is defined as a period of time from a first instance of receiving a signal to start the engine to a second instance when the aftertreatment system reaches a predetermined temperature.

15. The controller of claim 12, wherein the air mover generates the airflow that directs heat from the heater to the aftertreatment system to increase the temperature of the aftertreatment system.

16. The controller of claim 12, wherein the air mover is an exhaust gas recirculation (EGR) pump structured to generate the airflow from the intake to the heater while bypassing the engine.

17. The controller of claim 12, wherein the air mover and the heater are powered by at least one battery.

18. The controller of claim 12, wherein to maintain the engine in the off state, the one or more processors are operable to prevent combustion in the engine during a warmup period for the aftertreatment system.

19. The controller of claim 12, further comprising:

a turbine positioned downstream of the air mover and the engine and positioned upstream of the heater; and a compressor positioned upstream of the air mover and the intake of the engine.

* * * * *